United States Patent
Surya et al.

(10) Patent No.: US 12,217,172 B2
(45) Date of Patent: Feb. 4, 2025

(54) ADAPTIVE OFF-RAMP TRAINING AND INFERENCE FOR EARLY EXITS IN A DEEP NEURAL NETWORK

(71) Applicant: Microsoft Technology Licensing, LLC, Redmond, WA (US)

(72) Inventors: Siva Kalyana Pavan Kumar Mallapragada Naga Surya, Redmond, WA (US); Joseph John Pfeiffer, III, Bothell, WA (US); Davis Leland Gilton, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 905 days.

(21) Appl. No.: 17/348,299

(22) Filed: Jun. 15, 2021

(65) Prior Publication Data
US 2022/0398451 A1     Dec. 15, 2022

(51) Int. Cl.
| | |
|---|---|
| *G06N 3/08* | (2023.01) |
| *G06F 16/953* | (2019.01) |
| *G06F 18/214* | (2023.01) |
| *G06F 18/25* | (2023.01) |

(52) U.S. Cl.
CPC .............. *G06N 3/08* (2013.01); *G06F 16/953* (2019.01); *G06F 18/214* (2023.01); *G06F 18/25* (2023.01)

(58) Field of Classification Search
CPC .......... G06N 3/08; G06N 3/045; G06N 3/082; G06F 16/953; G06F 18/214; G06F 18/25
See application file for complete search history.

(56) References Cited

U.S. PATENT DOCUMENTS 10,666,342 B1 *   5/2020   Landis ................. H04B 17/318

OTHER PUBLICATIONS

Ba, et al., "Adaptive Dropout for Training Deep Neural Networks", In Proceedings of Advances in Neural Information Processing Systems, Dec. 5, 2013, 9 Pages.

"Invitation to Pay Additional Fees Issued in PCT Application No. PCT/US22/029178", Mailed Date: Sep. 28, 2022, 12 Pages.

(Continued)

*Primary Examiner* — Xiao En Mo

(57) ABSTRACT

Systems and methods are provided for training and using a deep neural network with adaptively trained off-ramps for an early exit at an intermediate representation layer. The training includes, for respective intermediate representation layers of a sequence of intermediate representation layers, predicting a label based on the training data and comparing against a correct label. The training further includes generating a confidence value associated with the predicted label. The confidence value is based on optimizing an objective function that includes a weighted entropy of a probability distribution of the likelihood, weighted based on whether previous intermediate representation layer has accurately predicted the label. Use of the weighted entropy provides the training with a focus on predicting labels that the previous intermediate representation layers has performed poorly and not labels that have existed before the intermediate representation layer being trained. Among alternative methods include a distilled twin, parallel neural network for predicting labels using adaptively trained off-ramps.

20 Claims, 11 Drawing Sheets

(56) References Cited

OTHER PUBLICATIONS

Xin, et al., "DeeBERT: Dynamic Early Exiting for Accelerating BERT Inference", In Repository of arXiv:2004.12993v1, Apr. 27, 2020, 6 Pages.
"International Search Report and Written Opinion Issued in PCT Application No. PCT/US22/029178", Mailed Date: Nov. 21, 2022, 15 Pages.

* cited by examiner

ADAPTIVE OFF-RAMP TRAINING AND INFERENCE FOR EARLY EXITS IN A DEEP NEURAL NETWORK

BACKGROUND

Machine learning technologies based on deep neural networks have become popular. As the machine learning improves accuracy in inferring an answer from a query, the size of the deep neural networks has increased. The increase in size of the deep neural networks has resulted in an increase in a number of layers of deep neural networks (e.g., some deep neural networks include a few thousand layers). The increase in the number of layers translates into a higher latency in generating inferences, raising issues particularly in latency critical real-time systems (e.g., web search, web-ads, and self-driving cars). Accordingly, the latency for generating inferences with accuracy in real-time has become an issue.

Various attempts for improving the performance indicate various tradeoffs. For example, there is a tradeoff between time needed for training/retraining and generating inferences. The attempts indicate tradeoffs between a level of complexity in internal structures and robustness of tasks that the deep neural network predicts with accuracy. In practice, the attempts to improve performance include quantization for compressing the deep neural network for faster processing. They also included distillation trained on a smaller neural network that mimics the behavior of the original deep neural network. Yet another example of adaptive learning included entirely re-training of a model with data-dependent partial execution of the deep neural network. Yet another example included early exiting to make predictions using intermediate layers without processing all the layers of the deep neural network. These attempts provide distinct tradeoffs in robustness, complexity, and time needed for training and retraining the deep neural network. Thus, developing a technology that better meets the needs of predicting with accuracy while minimizing trade-offs would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by training "off-ramps" on respective prediction layers of a deep neural network for adaptive exits. The term "prediction layer" includes an intermediate representation layer of the deep neural network. The term "off-ramp" refers to a neural network layer that is trained to mimic the functionality of the final decision making layer (e.g., a classification decision) at one or more intermediate representation layers. In particular, the adaptive exits from the deep neural network through the "off-ramps" take place when a label that the prediction layer has predicted based on an input query is sufficiently accurate. In aspects, a "query" may refer to input data to the system and a "label" may refer to an output of the system as a predicted result or an answer.

The present disclosure relates to training a deep neural network including a plurality of intermediate representation and a final task specific prediction layers. Once trained, the deep neural network is applicable for regression tasks and/or predicts a label based on the representation generated by the final layer after passing an input query through the one or more intermediate representation layers in sequence. In particular, the disclosed technology includes training respective intermediate representation layers and off-ramps associated with the respective off-ramps layers of the deep neural network. The deep neural network according to the present disclosure includes adaptively trained off-ramps for an early exit from an intermediate representation layer when a confidence value of the predicted label is within a range of sufficient accuracy.

The training mechanism for such a neural network capable of early exit via an intermediate layer needs to solve two problems: 1) determine the exit criterion for respective examples, and 2) train the off-ramp with samples exiting at the corresponding intermediate representation layer by determining which subset of the samples can exit as early as possible in the deep neural network. The training task therefore includes a per-layer predictor training method and a per-layer off-ramp determiner (e.g., exit criterion). The per-layer predictor predicts a label based on intermediate representation of the plurality of layers in the deep neural network. The per-layer off-ramp determiner determines a confidence value of a predicted label. When the confidence value of the predicted label is higher than a predetermined threshold, the per-layer off-ramp determiner increases the change of using that confident example to train the off-ramp from the layer and provides the label as output of the deep neural network. Otherwise, the per-layer off-ramp determiner passes on the predicted label to a subsequent layer of the plurality of layers of the deep learning for the subsequent off-ramps to use the sample for training. The aspect may include a wrapper based approach without a need to train the "back-bone" network to enable off-ramp exits to improve its efficiency. The disclosed technology is applicable to off-the-shelf deep neural networks and increases their performance without losing their predictive power. The predictor trainer trains the off-ramps of the deep neural network by iteratively predicting a label using training data at each layer from the first layer until a layer to off-ramp. Determining the training data at respective nodes can be done deterministically (i.e., including high confidence classifications) or stochastically (i.e., increasing the chance of high confidence predictions to be a part of the training set of respective off-ramps).

The predictor includes a present layer processor and a task-specific processor for predicting a label based on input to a trained deep neural network.

The disclosed technology includes a training process and a prediction process of a classification system and/or a regression system. The training process includes, using training data, iterative training of layers from a first layer to subsequent layers until a label predicted by a layer is at a sufficient confidence value.

Some examples include a method for training a deep neural network to off-ramp from a layer as an early exit. The method may include receiving training data, predicting, based on the training data, a label using a prediction layer in a sequence of prediction layers, determining a combination of a weighted entropy value associated with the label and a confidence value of the label, training, based on the combination and a predetermined threshold, the prediction layer and an off-ramp associated with the prediction layer to exit from the deep neural network, removing, based at least on the trained prediction layer, a portion of the training data to create updated training data, resampling the updated training data, and training, based on resampled training data, a subsequent production layer of the sequence of prediction layers. The method further comprising receiving an input query, determining a feature of the input query, determining, prior to processing the input query in the sequence of prediction layers and based on the feature of the input query, a target prediction layer to exit from the deep neural network, wherein the sequence of prediction layers includes the trained prediction layer, iteratively predicting, based on the input query, a candidate label using a sequence of the trained prediction layers up to and including the target prediction layer of the deep neural network, exiting from the deep neural network using an off-ramp associated with the target prediction layer, and transmitting the candidate label. The method may further comprise receiving an input query, determining a feature of the input query, determining, prior to processing the input query in the sequence of prediction layers and based on the feature of the input query, a target prediction layer to exit from the deep neural network, wherein the sequence of prediction layers includes the trained prediction layer, iteratively predicting, based on the input query, a candidate label using a sequence of the trained prediction layers up to and including the target prediction layer of the deep neural network, exiting from the deep neural network using an off-ramp associated with the target prediction layer, and transmitting the candidate label. The method may further comprise receiving an input query, predicting, based on the input query, the candidate label using the trained prediction layer of the deep neural network, determining, based on a combination of a candidate weighted entropy value associated with the candidate label, a confidence value associated with the candidate label, exiting, based on a predetermined threshold and the confidence value associated with the candidate label predicted at the trained prediction layer, the deep neural network using an off-ramp associated with the target prediction layer, and subsequent to the exiting, transmitting the candidate label. The resampled training data includes one or more labels, and wherein confidence values associated with the one or more labels are below a predetermined threshold. The weighted entropy value depends on the predetermined threshold and a confidence score of the label predicted by one or more previous prediction layers, and wherein the prediction layer includes an intermediate representation layer of the deep neural network. The weighted entropy value includes a weighted probability distribution indicating likelihood of one or more candidate labels accurately predicting the one or more candidate labels based on an input query, and wherein the weighted probability distribution is based on one or more previous prediction layers accurately predicting the one or more candidate labels. The method may further comprise receiving a set of labels, wherein each label of the set of labels represents a title of directed content, generating, based on the set of labels, a set of embedding data, receiving an input query, wherein the input query is associated with a selection of content on a web page, iteratively generating, based on the input query and the set of embedding data, an intermediate query representation using one or more prediction layers of the sequence of prediction layers, generating a final label representation using a last prediction layer of the sequence of the prediction layers, determining, based at least on the intermediate query representation and the final label representation, a candidate label, wherein the candidate label specifies a directed content in response to the selection of content on the web page, and transmitting, responsive to the input query, the candidate label as a candidate title of the directed content.

Some examples include a system for predicting a label using an adaptive off-ramp for an early exit from a deep neural network. The system may comprise a processor, and a memory storing computer-executable instructions that when executed by the processor cause the system to receive an input query, determine a feature of the input query, determine, prior to processing the input query in the sequence of prediction layers and based on the feature of the input query, a target prediction layer to exit from the deep neural network, wherein the sequence of prediction layers includes a trained prediction layer, iteratively predict, based on the input query, a candidate label using the sequence of trained prediction layers up to and including the target prediction layer of the deep neural network, exit from the deep neural network using an off-ramp associated with the target prediction layer, and transmit the candidate label. The system may further comprise computer-executable instructions that when executed by the processor cause the system to predict, based on the input query, the candidate label using the trained prediction layer of the deep neural network, determine, based on a combination of a candidate weighted entropy value associated with the candidate label, a confidence value associated with the candidate label, exit, based on a predetermined threshold and the confidence value associated with the candidate label predicted at the trained prediction layer, the deep neural network using an off-ramp associated with the trained prediction layer, and subsequent to the exiting, transmit the candidate label. The system may further comprise computer-executable instructions that when executed by the processor cause the system to receive training data, predict, based on the training data, the label using a prediction layer in a sequence of prediction layers, determine a combination of a weighted entropy value associated with the label and a confidence value of the label, training, based on the combination and a predetermined threshold, the prediction layer and an off-ramp associated with the prediction layer for exiting the deep neural network, removing, based at least on the trained prediction layer, a portion of the training data to create updated training data, resampling the updated training data, and training, based on resampled training data, a subsequent prediction layer of the sequence of prediction layers. The training the prediction layer and the off-ramp associated with the prediction layer uses a subset of the training data, and wherein the subset of the training data corresponds to data where the previous prediction layer predicts with the confidence value below a predetermined threshold. The weighted entropy value is associated with a previous prediction layer, and wherein the weighted entropy value depends on whether the previous prediction layer predicts the label with a confidence value that is higher than a predetermined threshold, and wherein the prediction layer includes an intermediate representation layer of the deep neural network. The candidate weighted entropy value includes a weighted probability distribution indicating likelihood of one or more candidate labels accurately predicting the one or more candidate labels based on the input query, and wherein the weighted probability distribution is based on one or more previous prediction layers accurately predicting the one or more candidate labels. The system may further comprise computer-executable instructions that when executed by the processor cause the system to receive a set of labels, wherein each label of the set of labels represents a title of directed content, generate, based on the set of labels, a set of embedding data, receive an input query, wherein the input query is associated with a selection of content on a web page, iteratively generate, based on the input query and the set of embedding data, an intermediate query representation using one or more prediction layers of the sequence of prediction layers, generate a final label representation using a last prediction layer of the sequence of the prediction layers, determine, based at least on the intermediate query representation and the final label representation, a candidate label, wherein the candidate label specifies a directed content in response to the selection of content on the web page, and transmit, responsive to the input query, the candidate label as a candidate title of the directed content.

Some examples include a computer storage media storing computer-executable instructions. The computer storage media storing computer-executable instructions that when executed by a processor cause a computer system to perform operations may comprise receiving an input query, determining a feature of the input query, determining, prior to processing the input query in a sequence of prediction layers and based on the feature of the input query, a target prediction layer to exit from a deep neural network, wherein the sequence of prediction layers includes a trained prediction layer, and wherein the trained prediction layer includes an intermediate representation layer of the deep neural network, iteratively predicting, based on the input query, a candidate label using the sequence of trained prediction layers up to and including the target prediction layer of the deep neural network, exiting the deep neural network using an off-ramp associated with the target prediction layer, and transmitting the candidate label. The computer-executable instructions that when executed cause operations may further comprise predicting, based on the input query, the candidate label using the trained prediction layer of the deep neural network, determining, based on a combination of a candidate weighted entropy value associated with the candidate label, a confidence value associated with the candidate label, exiting, based on a predetermined threshold and the confidence value associated with the candidate label predicted at the trained prediction layer, the deep neural network using an off-ramp associated with the trained prediction layer, and subsequent to the exiting, transmitting the candidate label. The computer-executable instructions that when executed cause operations may further comprise receiving training data, predicting, based on the training data, the label using a prediction layer in a sequence of prediction layers, determining a combination of a weighted entropy value associated with the label and a confidence value of the label, training, based on the combination and a predetermined threshold, the prediction layer and an off-ramp associated with the prediction layer for exiting from the deep neural network, removing, based at least on the trained prediction layer, a portion of the training data to create updated training data, resampling the updated training data, and training, based on resampled training data, a subsequent prediction layer of the sequence of prediction layers. The computer-executable instructions that when executed cause operations may further comprise exiting, based on a level of workload of the computing system, the deep neural network using an off-ramp associated with the target prediction layer. The training the prediction layer and the off-ramp associated with the prediction layer uses a subset of the training data, and wherein the subset of the training data corresponds to data where a previous prediction layer predicts with the confidence value below a predetermined threshold, and wherein the prediction layer includes an intermediate representation layer of the deep neural network. The computer-executable instructions that when executed cause operations may further comprise receiving a set of labels, wherein each label represents a title of directed content, generating, based on the set of labels, a set of embedding data, receiving an input query, wherein the input query is associated with a selection of content on a web page, iteratively generating, based on the input query and the set of embedding data, an intermediate query representation using one or more prediction layers of the sequence of prediction layers, generating a final label representation using a last prediction layer of the sequence of the prediction layers, determining, based at least on the intermediate query representation and the final label representation, a candidate label, wherein the label specifies a directed content in response to the selection of content on the web page, and transmitting, responsive to the input query, the candidate label as a candidate title of the directed content.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

Figure 4A:
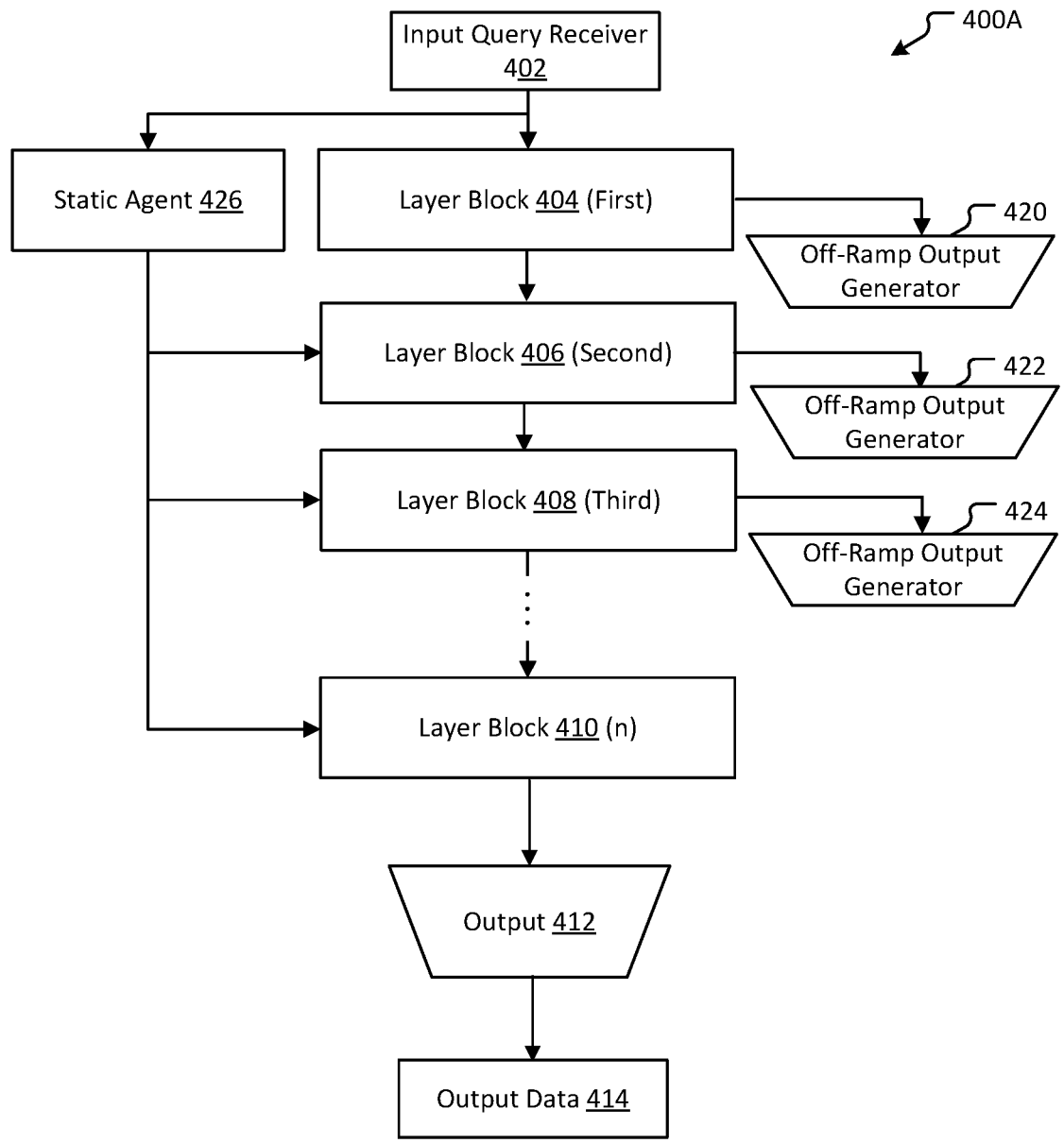
Figure 4B:
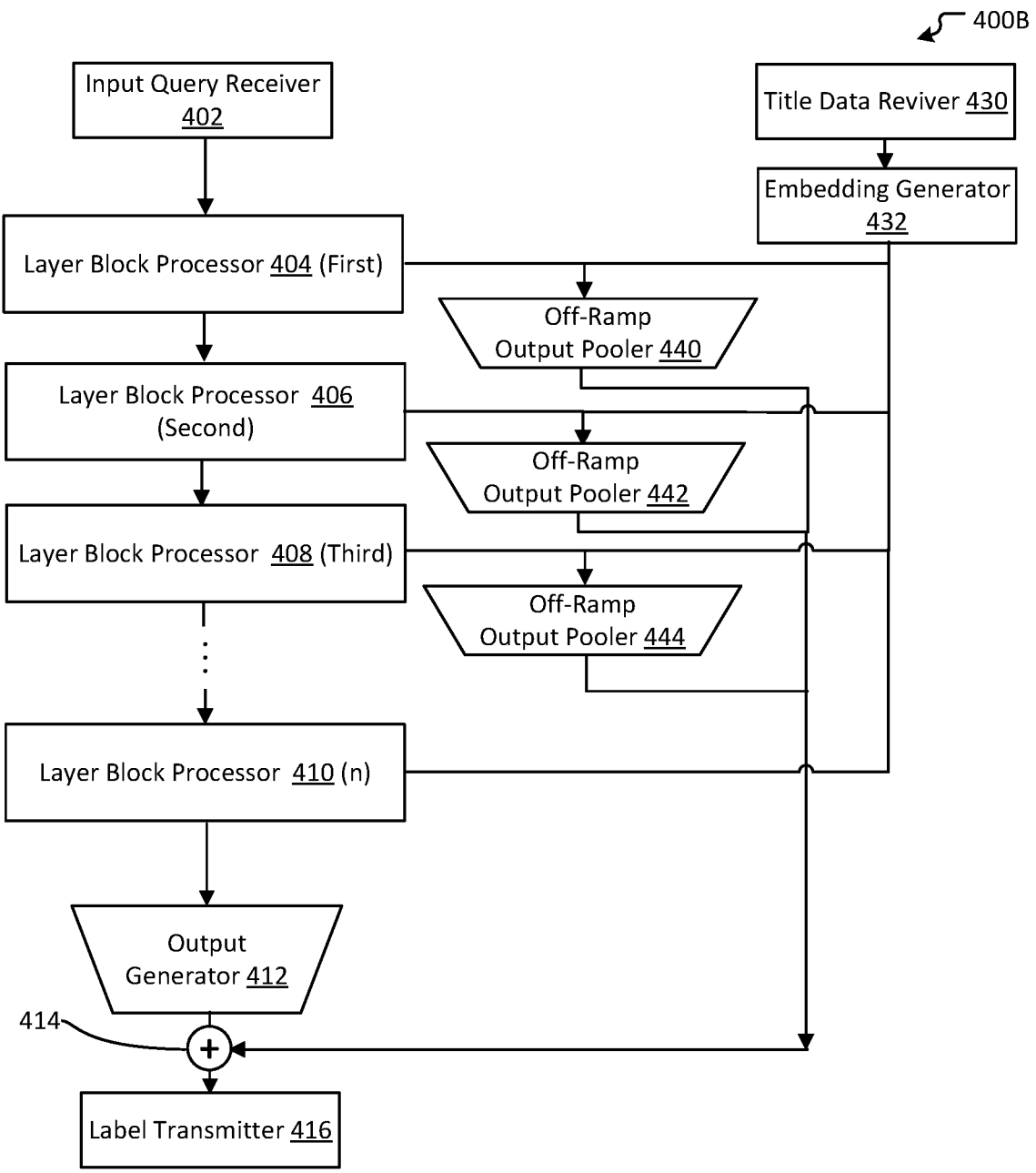

FIGS. 4A-B illustrate an example of a deep neural network with off-ramp output in accordance with aspects of the present disclosure.

Figure 5:
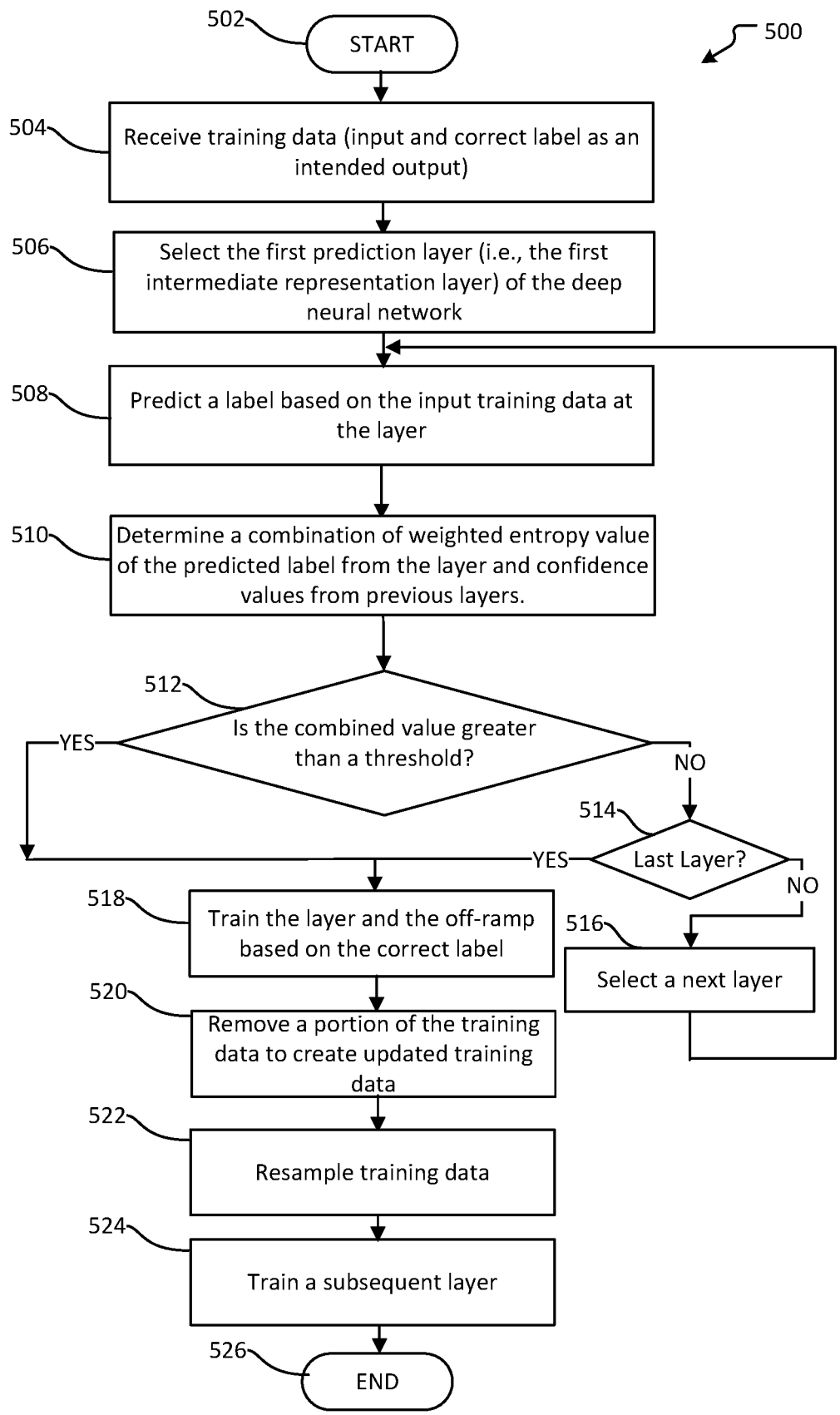

FIG. 5 illustrates an example of a method for training a deep neural network with an off-ramp early exit in accordance with aspects of the present disclosure.

Figure 6A:
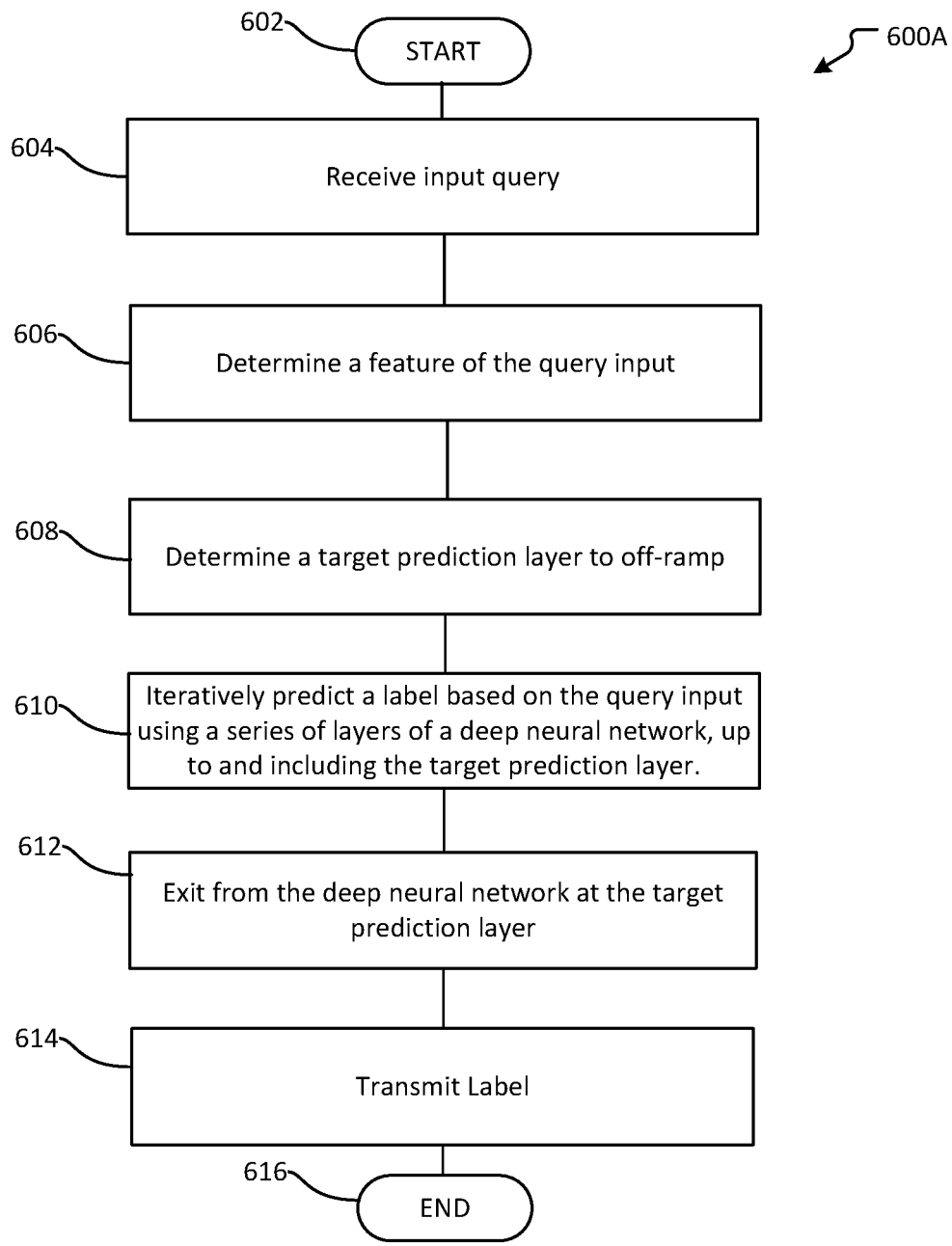
Figure 6B:
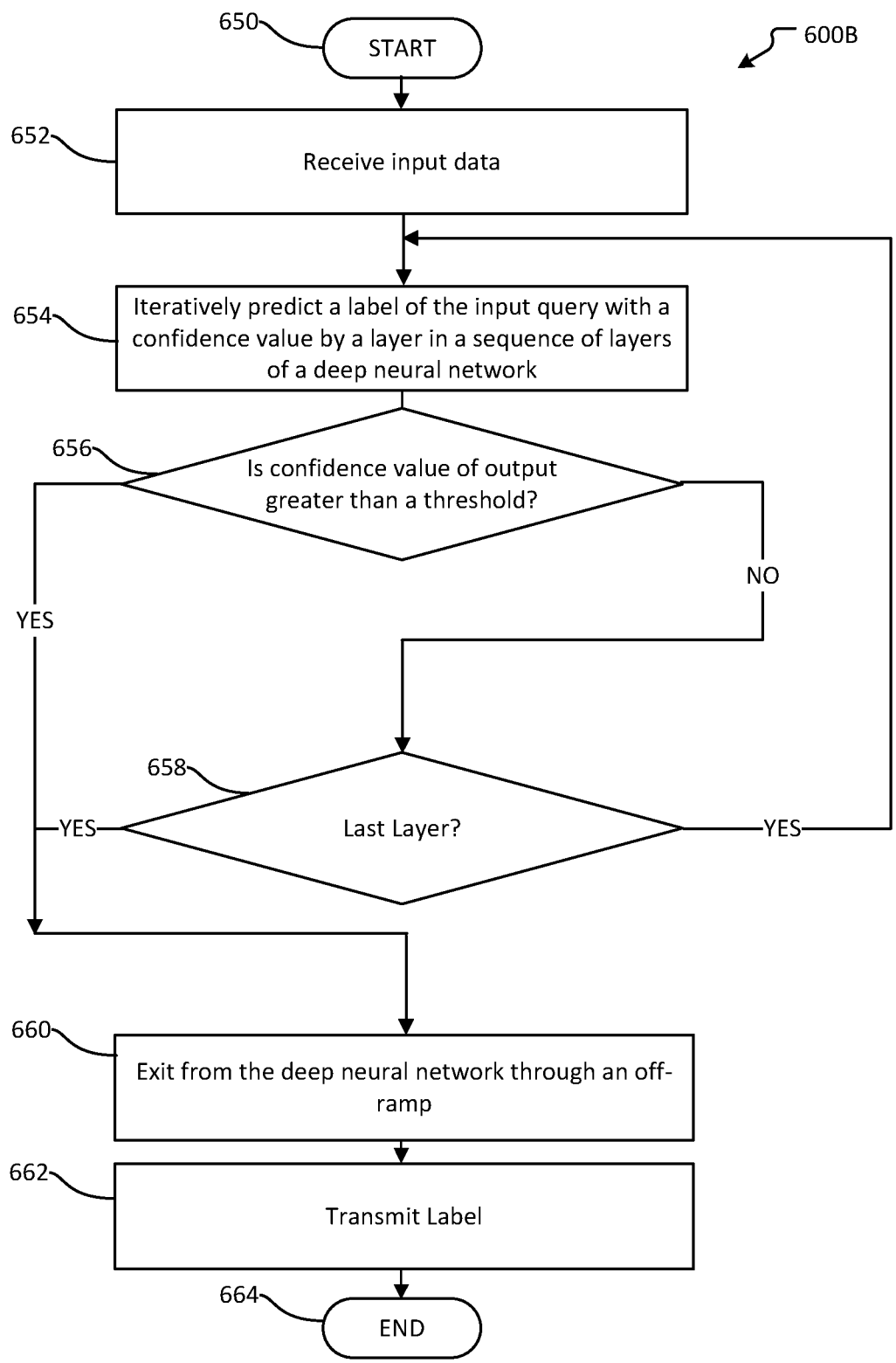

FIG. 6A-B illustrate examples of a method for predicting labels using a deep neural network with an off-ramp early exit in accordance with aspects of the present disclosure.

Figure 7:
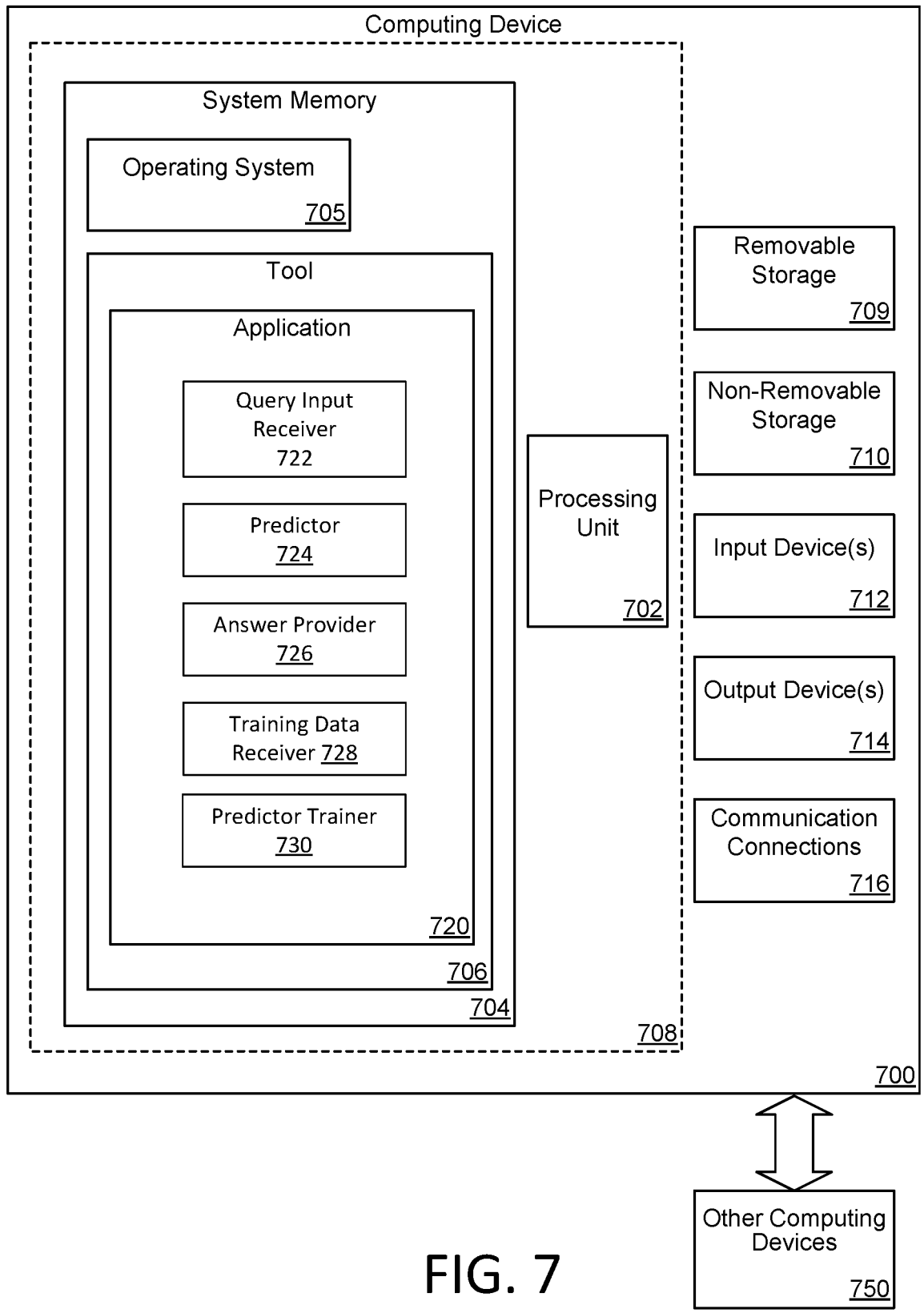

FIG. 7 is a block diagram illustrating example physical components of a computing device with which aspects of the disclosure may be practiced.

Figure 8A:
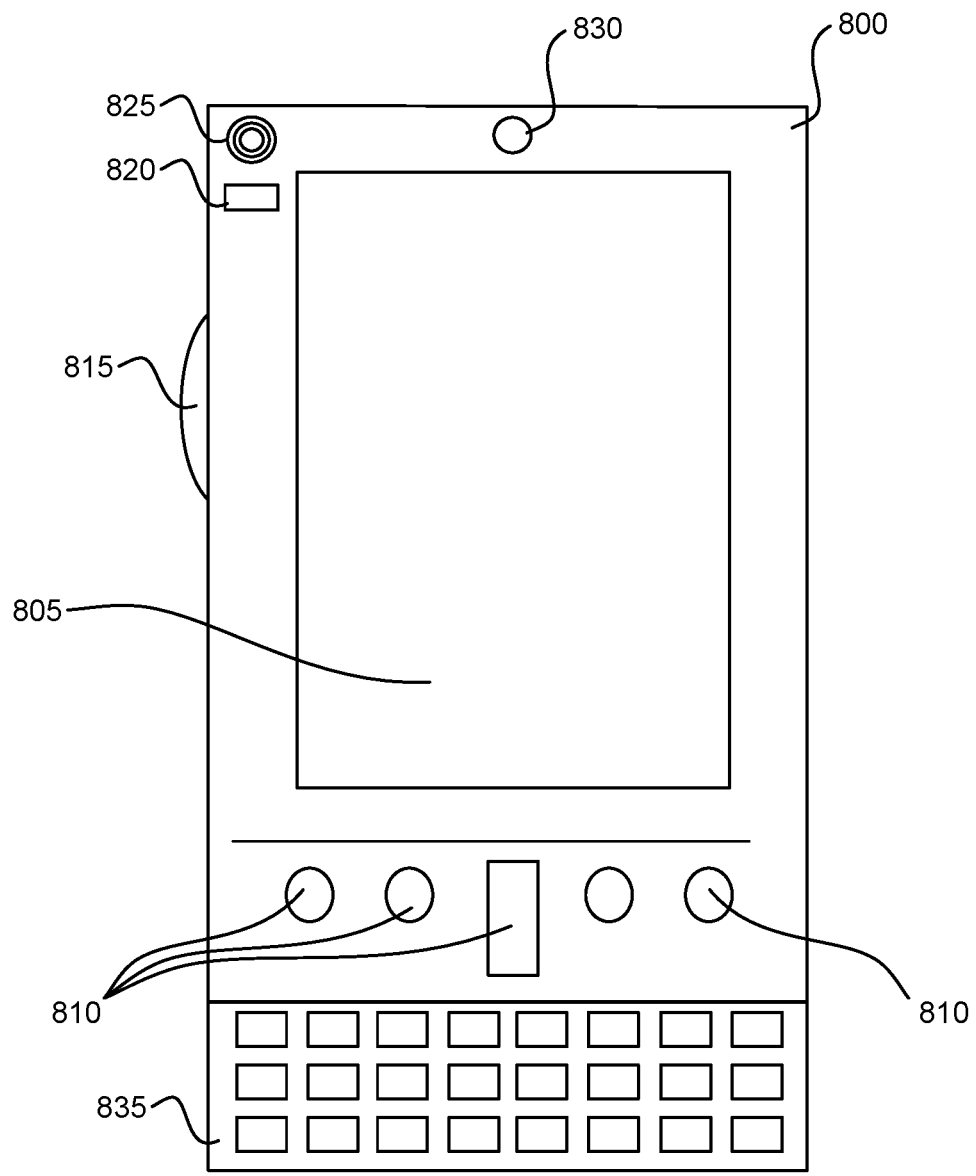

FIG. 8A is a simplified diagram of a mobile computing device with which aspects of the present disclosure may be practiced.

Figure 8B:
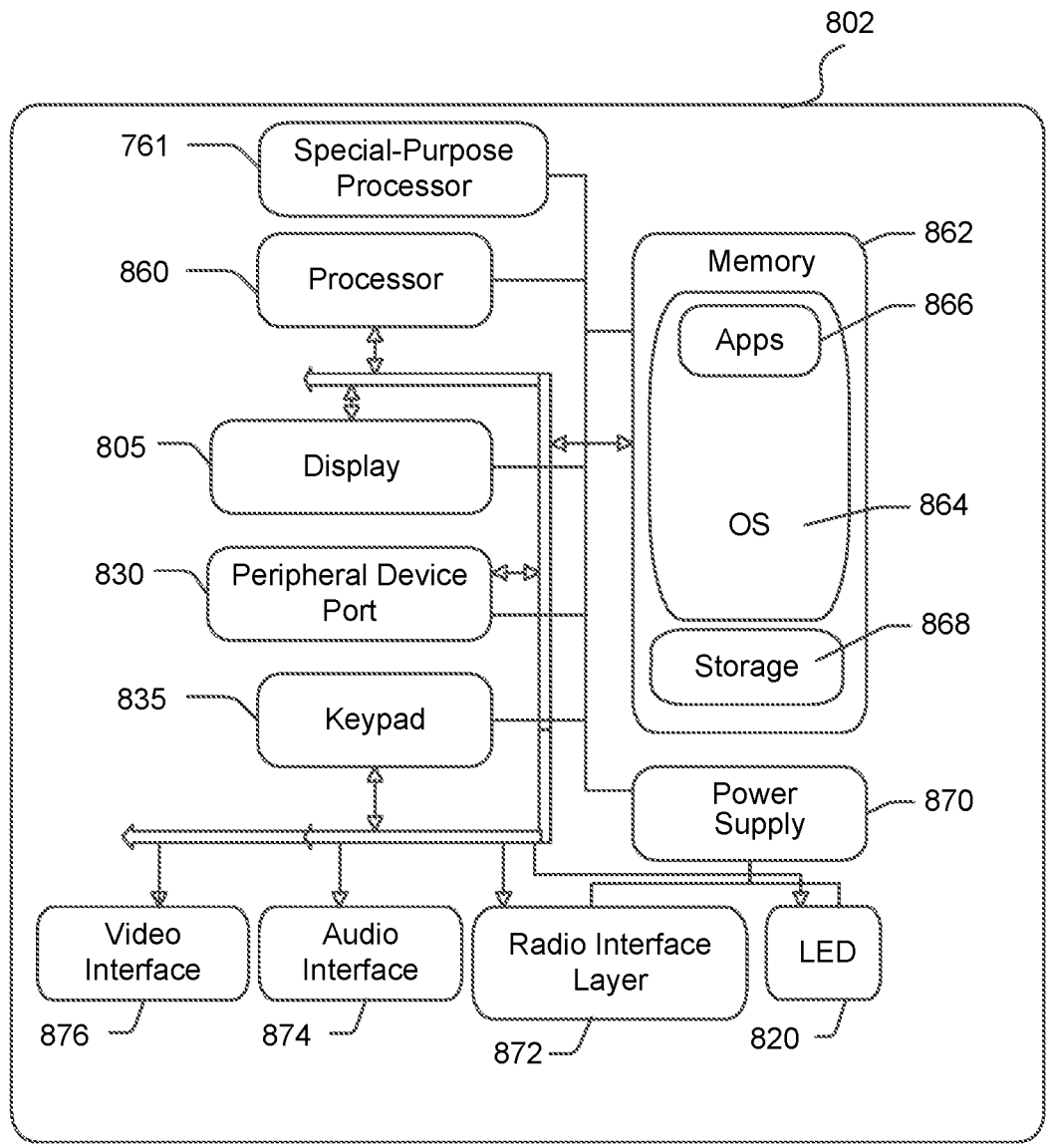

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

In aspects, a deep neural network for machine learning includes multiple intermediate representation layers and one or more task-specific layers. Respective intermediate representation layers may include classifiers that classify or predict input data into one or more classes with confidence scores. Classifying information relies on understanding a given piece of information (e.g., an image data) and determining a subset of classes or labels from a set of classes or labels in the given information. The confidence scores indicate how likely the respective classes match the input data. In aspects, intermediate representation layers are in a sequence of increasing generality in classifying the input data. The first intermediate representation layer after receiving input data classifies the input data based on details of the input data. The subsequent intermediate representation layers classify based on higher level of generality. For example, the first layer may classify a photo of aircraft by recognizing on a combination of parts of the aircraft (e.g., wings and a long fuselage in the photo). Subsequent layers may classify the image by increasing generality of the image (e.g., inferring an overall shape and parts based on parts that are missing from the photo to classify as an aircraft). In aspects, the machine learning according to the present disclosure is based on a non-autoregressive model. The machine learning according to the present disclosure is based on a transformer model.

State of the art models in deep learning typically use very deep networks. These networks suffer from high latency, and cannot perform inference in real time. Among several approaches to cut latency, early exiting avoids executing the entire network by computing outputs based on intermediate representative layers, using task-specific output modules called "off-ramps."

As discussed in more detail below, the present disclosure relates to training and using a deep neural network with adaptively trained off-ramp as an early exit to predict a label from input. Training the deep neural network includes use of training data (e.g., a pair of an input and a correct label as output) and starts from the first layer of the deep neural network. The training determines whether a predicted label based on the input from the first layer matches with the correct label. In aspects, the predicted label is a label with the highest confidence value and the entropy of probability distribution across all candidate labels is low. That is, the predicted label is much more likely to be correct than others. When the predicted label is the same as the correct label in the training data, the training updates parameters of the first layer to off-ramp from the deep neural network to complete the prediction process. When the predicted label is not the correct label and/or the entropy is high (e.g., none of candidate labels stands out from others), the training uses the same input to train the second intermediate representation layer.

In aspects, the training improves upon a pre-trained neural network. Training an off-ramp for an intermediate representation layer focuses on improving accuracy of predictions on input queries that the off-ramps associated with previous intermediate representation layers predicted poorly. Accordingly, the training resamples training data by excluding data that the off-ramps in the previous intermediate representation layers successfully predicted and trained.

Figure 1:
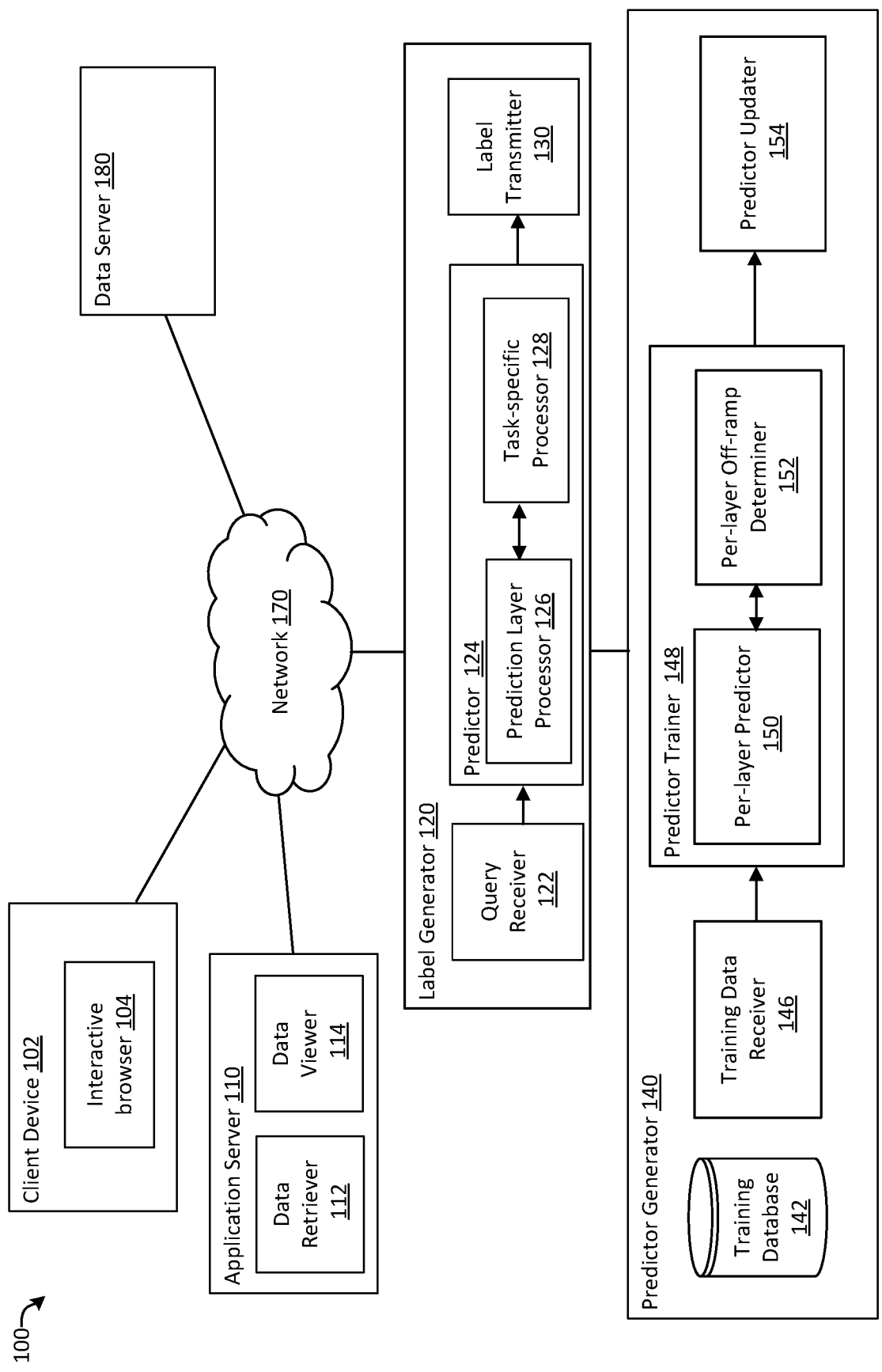
FIG. 1 illustrates an overview of an example system for training a predictor and predicting a label using the trained predictor in accordance to aspects of the present disclosure.

FIG. 1 illustrates an overview of an example system 100 for training and using a deep neural network with adaptively trained off-ramp for an early exit in accordance with aspects of the present disclosure. System 100 represents a system for using a deep neural network with task-specific processor for the adaptively trained off-ramp. System 100 includes a client device 102, an application server 110, a label generator 120, a predictor generator 140, a network 170, and a data server 180.

The client device 102 communicates with the application server 110, which includes one or more sets of instructions to execute as applications on the client device 102. The application server 110 includes a data retriever 112 and a data viewer 114. The one or more sets of instructions in the application server 110 may provide an interactive user interface through an interactive browser 104.

The label generator 120 includes a query receiver 122, a predictor 124, a prediction layer processor 126, a task-specific processor 128, and a label transmitter 130. The network 170 provides network connectivity among the client device 102, the application server 110, and the label generator 120, and the data server 180. The predictor generator 140 includes training database 142, a training data receiver 146, a predictor trainer 148, and a predictor updater 154. The predictor trainer 148 includes a per-layer predictor 150 and a per-layer off-ramp determiner 152. The data server 180 stores and serves data to the label generator 120 and the application server 110 over the network 170.

The client device 102 connects with the application server 110 via the network 170 to execute applications that include user interactions through the interactive browser 104. The application server 110 interacts with the client device 102 and the label generator 120 via the network 170 to perform various application services (e.g., an image recognition, a text summary, etc.). The predictor generator 140 generates and updates a deep neural network with adaptively trained off-ramp early exits.

The application server 110 is a server that enables an interactive use of the system 100 to the user on the client device 102. For example, the user may search for information based on a trained deep neural network. The application server 110 may comprise applications including the data retriever 112 and the data viewer 114. The data retriever 112 may be used to query and receive data by communicating with the label generator 120, for example. The data viewer 114 may provide a rendering of retrieved data for viewing by the user.

In aspects, the data retriever 112 may connect with the query receiver 122 of the label generator 120 to query information. The label generator 120 operates as a predicting process of the information processing system. For example, the application for retrieving data may include, but is not limited to, an image labeling that determines a label based on an image as an input query. Other examples may include a sponsored website that provides one or more web advertisements (i.e., directed content). The label generator 120 recommends a title of a website and/or web advertisement in response to a given query.

The predictor 124 predicts a label based on a received input query using a trained deep neural network. The trained deep neural network includes a series of intermediate representation layers (i.e., prediction layers). Each layer predicts a label based on increasing levels of generality. For example, the first prediction layer predicts a label based on detailed features (e.g., a leaf on a tree in a forest) in the input query. The second layer predicts another label by focusing on increased generality based on output from the first layer.

The last layer predicts a label using an output from its preceding layer based on the "big picture" (e.g., the forest) as inferred from the query. In aspects, the deep neural network may predict a label that is sufficiently accurate before reaching the last layer when the input query (e.g., a photo) is relatively simple among the queries in the training data. In some aspects, an increase of accuracy in predicting a label through the multiple layers is non-linear. The prediction may reach sufficiently accurate based on processing through the first few prediction layers and a marginal increase in accuracy may become smaller while processing through the rest of the layers. In aspects, the task-specific processor 128 determines whether to early exit at every prediction layer. When the entropy is not low and there is no particular label with distinctly a high confidence value, the task-specific processor 128 determines to continue the predicting process onto the next prediction layer.

Additionally or alternatively, the predictor 124 may determine which layer to exit from the deep neural network using an off-ramp before initiating layer-by-layer predictions. In aspects, the predictor 124 determines which layer to off-ramp based on the input query. The predictor 124 may determine which intermediate representation layer to exit based on a loss function. Predetermining a number of intermediate representation layers to use may reduce the overall latency of the intermediate representation when the input queries tend to be relatively simple in structure.

The deep neural network may predict labels at a sufficient level of accuracy earlier in the series of prediction labels, thereby enabling early exits from intermediate representation layers without using the rest of the intermediate representation layers. In aspects, a number of intermediate representation layers needed for predicting a label with sufficient accuracy may depend on a level of inference needed to interpret the input query (e.g., missing parts of content of a photo as an input). For example, an input query with a simple structure (e.g., a photo of an aircraft in full view with clear depictions of wings) may need a smaller number of intermediate representation layers to predict a label with accuracy. Accordingly, it is appropriate to use an off-ramp to exit from an intermediate layer of the deep neural network. In contrast, the deep neural network may need to use the most or all of the intermediate representation layers to accurately predict an aircraft as a label by making inference when an input query is missing "big picture" (e.g., a photo of a front view of a jet engine on the right wing of an aircraft).

The prediction layer processor 126 predicts labels using an intermediate representation layer. The task-specific processor 128 processes one or more labels with varying confidence values predicted by the intermediate representation layer. In particular, the task-specific processor 128 determines an adaptive use of an off-ramp for an early exit from the deep neural network. The exiting uses an off-ramp associated with the intermediate representation layer. The determining is based on confidence values of respective labels as predicted by the intermediate representation layer. A confidence value depends on entropy of a probability distribution of a likelihood of the labels being accurate. When the entropy is low, one of the predicted labels is much more likely to be accurate than others. Accordingly, the probability distribution has a bias toward a particular label.

In aspects, a confidence value for a predicted label is high when the entropy of the probability distribution is low and a probability of likelihood for the predicted label is higher than a predetermined threshold. Accordingly, the task-specific processor 128 determines that the label is sufficiently accurate for an early exit using an off-ramp from the intermediate representation layer of the deep neural network.

The label transmitter 130 transmits a predicted label as an answer to the input query. In aspects, the label transmitter 130 transmits the predicted label to the data retriever 112 of the application server 110.

The predictor generator 140 generates and trains the deep neural network, which predicts a label based on an input query. The predictor generator 140 includes a training database 142, a training data receiver 146, a predictor trainer 148, and a predictor updater 154. In embodiments, the predictor trainer 148 includes a per-layer predictor and a per-layer off-ramp determiner 152. In aspects, the predictor generator 140 trains the deep neural network with adaptively trained off-ramps using the training database 142.

The training database 142 stores training data for the deep neural network. In aspects, the training data include a pair of a sample input query (e.g., input image data) and a correct label as an answer. For example, the sample input query may include photos of aircrafts with varying views. The correct label is an "aircraft" as an answer for the sample input queries. In another example, the sample input query may be a selection (e.g., a click) of web content and the correct label include a title of a web ad or directed content. The training data receiver 146 receives the training data from the training database 142 and provides the training data to the predictor trainer 148 for training the deep neural network.

The predictor trainer 148 trains the deep neural network with adaptively trained off-ramp for an early exit. In aspects, the predictor trainer 148 may update a deep neural network that has been pre-trained with training data. In aspects, the predictor trainer 148 trains the off-ramps of the deep neural network in an adaptive manner. The predictor trainer 148 trains the deep neural network to early exit via an off-ramp of an intermediate representation layer when the predicted label has a confidence value above a predetermined threshold.

The predictor trainer 148 trains the off-ramps of respective intermediate representation layers using training data that the off-ramps are likely to process, rather than using the entire set of training data for training off-ramps of all prediction layers. In particular, the per-layer predictor 150 in the predictor trainer 148 first trains a classifier of the first intermediate representation layer in the deep neural network. The per-layer off-ramp determiner 152 identifies a set of example data with a confidence value above a predetermined threshold and determines that the set of example data is sufficiently accurate for an early exit from the deep neural network. The predictor trainer 148 then trains the second intermediate representation layer based on training data that excludes the identified set of example data (i.e., resampling the training data with low confidence values at the intermediate representation layer). Accordingly, training on the subsequent intermediate representation layer uses less training data. In practice, adaptively trained off-ramps based on an input query at an intermediate representation layer eliminate the need for the subsequent layer to process the input query. The training of the sequence of intermediate representation layers may take place an iterative manner in the layer by layer basis. The predictor updater 154 updates the deep neural network for use by the predictor 124 in the label generator 120.

Additionally or alternatively, the predictor trainer 148 uses a decreasing function of the confidence value as a weighting function of the example data for training an off-ramp for the subsequent layer in combination with a rate of erroneous predictions (e.g., a cost sensitive loss). Accordingly, the predictor trainer 148 may use distinct sets of training data for training off-ramps in distinct intermediate representation layers by removing portions of the training data that previous intermediate representation layers has predicted correct labels with confidence.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
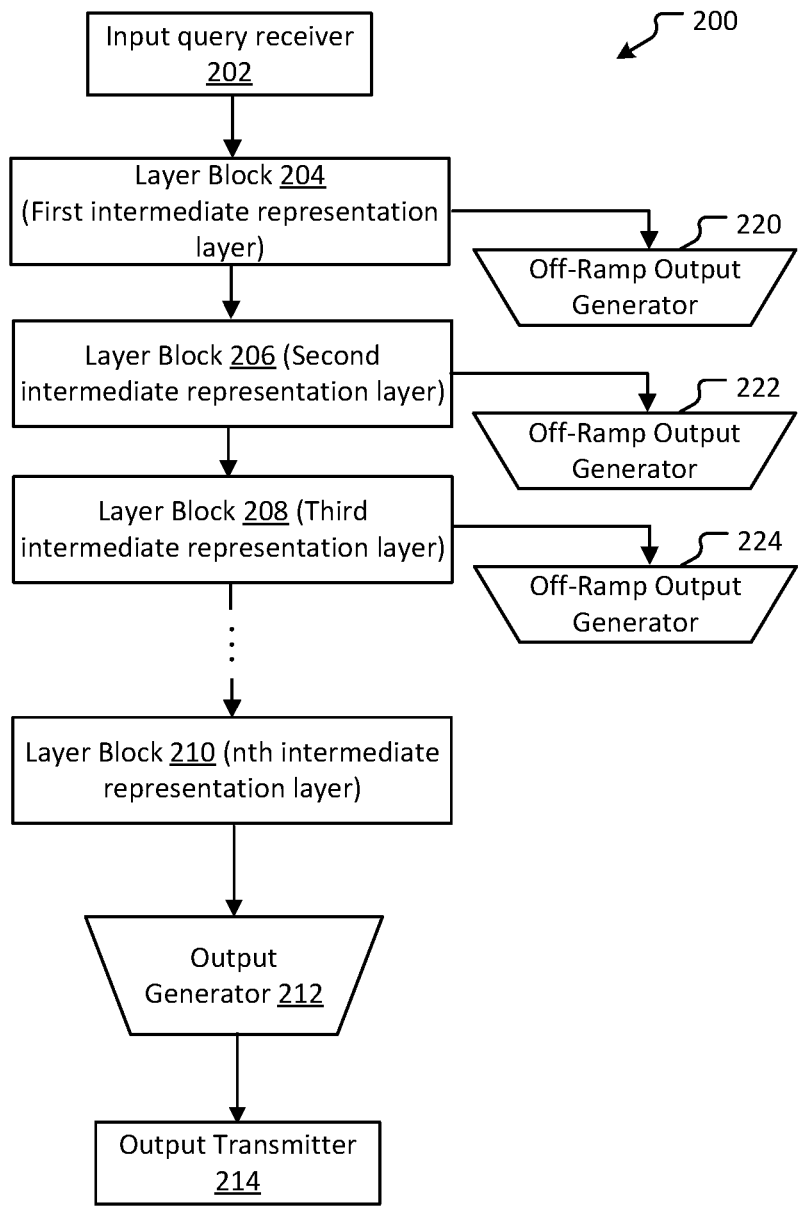
FIG. 2 illustrates an overview of an exemplar deep neural network with adaptive off-ramps in accordance with aspects of the present disclosure.

FIG. 2 illustrates an overview of an exemplar deep neural network with adaptively trained off-ramps in accordance with aspects of the present disclosure. The deep neural network 200 includes an input query receiver 202 and a series of layer blocks 204-210 (i.e., prediction layers or intermediate representation layers). The respective layer blocks include off-ramp output generators 220-224. In particular, the deep neural network 200 includes a layer block 204 (first) with an off-ramp output generator 220, a layer block 204 (first) with an off-ramp output generator 220, a layer block 206 (second) with an off-ramp output generator 222, and a layer block 208 (third) with an off-ramp output generator 224. In aspects, the deep neural network is a trained deep neural network. The trained deep neural network predicts a label based on an input query (e.g., an input image).

The input query receiver 202 receives an input query. The layer block 204 is the first intermediate representation layer of the deep neural network. The layer block 204 predicts one or more candidate labels based on the input query. The one or more candidate labels include a probability distribution of respective candidate labels that indicate likelihood of the candidate label accurately represents the input query. The layer block 204 further generates entropy data of the probability distribution and determines a confidence value of a predicted label with the highest probability of likelihood. The confidence value includes entropy of the probability distribution. When there are multiple candidate labels without one substantially standing out from others, the entropy is high. In contrast, the entropy is low when a probability of a particular label is disproportionally higher than the probabilities of other labels. When the confidence value is higher than a predetermined confidence value, the off-ramp output generator 220 generates the predicted label with the highest confidence value as an output. Since the layer-by-layer prediction stops at the off-ramp of an intermediate representation layer, the deep neural network does not process the input query in subsequent intermediate representation layers when an early exit occurs.

When the entropy is high, the layer block 204 (first) does not use the off-ramp for an early exit, but continues processing of prediction at the layer block 206 (second). The layer block 206 (second) generates a probability distribution of candidate labels and a confidence value of a predicted label with the highest likelihood. When the confidence value is higher than a predetermined confidence value, the off-ramp output generator 222 generates the predicted label with the highest confidence value as an output.

When the confidence is not higher than a predetermined threshold, the deep neural network continues to process the input query in subsequent intermediate representation layers. When the deep neural network processes the input query at the last block 210 (n), the output generator 212 generates a predicted label. The output transmitter 214 transmits the predicted label.

Figure 3:
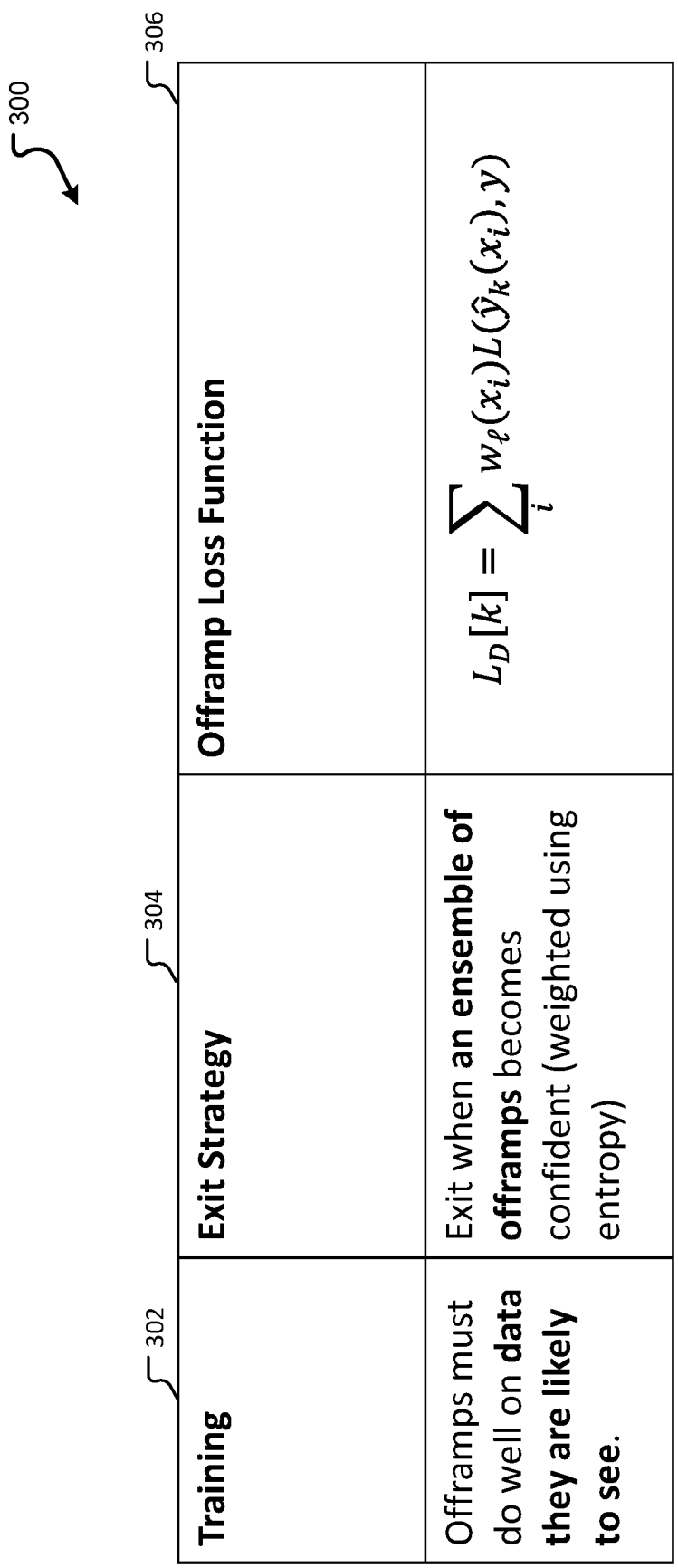
FIG. 3 illustrates an example of determining an early exit based on an off-ramp from a layer of layers in a deep neural network in accordance with aspects of the present disclosure.

FIG. 3 illustrates an example of conditions for training an intermediate representation layer of the deep neural network with adaptive exit at an off-ramp in accordance with aspects of the present disclosure. A condition for training 302 indicates an emphasis on the off-ramps accurately predicting a label on data that the respective off-ramps process. In aspects, once an intermediate representation layer predicts a label based on the exemplar input query at a confidence value higher than a predetermined threshold, training subsequent intermediate representation layers may exclude the exemplar input query that has exited via the off-ramp of the intermediate representation layer.

An exit strategy 304 from a particular off-ramp is based on optimizing an off-ramp loss function 306. The off-ramp loss function includes a sum of weighted entropy associated with a predicted label at intermediate representation layers leading up to the current intermediate representation layer. The weight depends on an intermediate representation layer. When a predicted label has a confidence level that is greater than a predetermined threshold in a previous intermediate representation layer, a weight for the previous intermediate representation layer is small. Accordingly, the off-ramp loss function has a reduced influence from predicted labels for which one or more previous intermediate representation layers indicated confidence and thus exited from the deep neural network. The predictor (e.g., the predictor 124 as shown FIG. 1) determines exiting from the off-ramp when an ensemble of off-ramps becomes confident based on an off-ramp loss function that is weighted using entropy.

In contrast, traditional systems train each intermediate representation layer with all of training data because the goal of training is to ensure all off-ramps accurately predict labels on all data. The off-ramp exit occurs when a predicted label at a particular layer has a high confidence value. The disclosed technology improves upon the traditional systems by allowing off-ramps to focus on accurately predicting a label based on a subset of the training data. The subset includes data that have not undergone early exits from previous intermediate representation layers because the previous intermediate representation layers have failed to predict a label with confidence.

FIGS. 4A-B illustrate examples of a deep neural network with adaptively trained off-ramps for early exits in accordance with the present disclosure. FIG. 4A depicts a deep neural network 400A where a number of layers to undertake layer-layer predictions is predetermined before predicting a label based on an input query in the first intermediate representation layer. An input query receiver 402 receives an input query for predicting a label. A static agent 426 analyzes the input query and determines a number of prediction layers the deep neural network iteratively processes the input query before using an off-ramp to exit from the deep neural network (or perform through the last prediction layer). In aspects, the static agent 426 determines a target intermediate representation layer to exit from the deep neural network based on the number of intermediate representation layers.

The static agent 426 analyzes the input query and determines at which intermediate representation layer the process should end. In aspects, the disclosed technology determines a number of layers to perform the prediction before initiating use of the deep neural network. In aspects, the static agent 426 determines which intermediate representation layer to off-ramp based on a feature or a level of complexity of input query. When the static agent 426 determines an intermediate representation layer to exit, the static agent 426 feeds the determined information to the respective layer blocks. Respectively layer blocks connect to respective off-ramp output generators. The layer block as specified by the static agent 426 provides the predicted label to an off-ramp for an early exit. For example, the static agent 426 may determine that the prediction process is to exit from an off-ramp after predicting a label at layer block 408 (Third). The layer block 404 (first) predicts a label. The layer block 406 (second) further predicts labels based on a result of prediction made by the layer block 404 (first). The layer block 408 (third) predicts the final label based on output from the layer block 406 (second). Instead of passing the predicted label to its subsequent layer block, the layer block 408 (third) passes the predicted label onto the off-ramp output generator 424. The off-ramp output generator 424 generates and transmits the predicted label as an output from the deep neural network 400A. The static agent 426 enables controlling a minimum number of intermediate representation layers to process. The static agent 426 further maintains a minimum level of accuracy in predicting labels compared to the full-network baseline where all the intermediate representation layers are used.

Additionally or alternatively, the static agent 426 may limit a number of intermediate representation layers when a workload of the system is higher than a predetermined threshold. In aspects, there is a trade-off between attaining accuracy in predicting a label and conserving a workload on a system. When a workload of the system is higher than a predetermined threshold, the static agent 426 may lower a number of intermediate representation layers in response to an input query to prevent overloading the system. Accordingly the system sacrifices a level of accuracy of predicting labels while preventing the system from an overload. In some other aspects, the static agent 426 may increase a number of intermediate representation layers to use when a workload on the system is below a predetermined threshold, indicating that the system can afford use of idle resources to predict labels with higher accuracy by processing more intermediate representation layers.

In aspects, the disclosed technology includes a training of the static agent 426. The predictor trainer (e.g., the predictor trainer 148 as shown in FIG. 1) first trains the deep neural network with all the layer blocks (i.e., prediction layers and/or intermediate representation layers) and freezes the weights in the off-ramp loss function (e.g., the off-ramp loss function 306 as shown in FIG. 3). Then, the predictor trainer trains off-ramps associated with respective layer blocks while keeping the parameters associated with the layer blocks constant. Finally, the predictor trainer trains the static agent 426 based at least on a probability that indicates which layer block is the most probable for exiting while minimizing erroneously exiting at the layer block. In aspects, the static agent 426 includes a multi-layer feedforward network. In some other aspects, the static agent 426 includes multiple convolutional layers followed by an off-ramp output generator.

Additionally or alternatively, the disclosed technology uses a dynamic agent for determining which layer block to exit from the deep neural network. In aspects, the dynamic agent determines whether to exit after each layer block predicting a label.

FIG. 4B illustrates an example of using a deep neural network 400B based on a parallel deep neural networks (e.g., TwinBERT) for predicting a label based on an input query under a regression framework. An input query receiver 402 receives an input query. For example, the input query may be a selection of content by the user on a web page. The deep neural network predicts a title of directed content (e.g., a web ad) to display in response to the selection. A title data receiver 430 receives titles of all directed content. The deep neural network predicts a title from the received titles in response to a received input query. An embedding generator 432 generates embedding (i.e., a multi-dimensional vector form) of all the received titles. In aspects, the deep neural network 400B stores embedded data corresponding to all the titles before using an input query to predict a title. In aspects, titles of direct content tend to be stable, without having substantial changes over time.

A layer block 404 (first) predicts as the first layer of the deep neural network a label based on the input query and the embedded title data. An off-ramp output pooler 440 pools the intermediate query representations as an output from the layer block 404 (first). The layer block 406 (second) uses the output from the layer block 404 (first) to predict a title based on the embedded title data. The off-ramp output pooler 442 pools the intermediate query representations. Off-ramps pool different branches with distinct parameters associated with respective branches. The processing continues similarly by the subsequent layer blocks. After the last layer block 410 (nth layer) predicts a label, the output generator 412 generates a final title representation with all pooled intermediate query representations. In aspects, the example deep neural network distills the twin, parallel neural network by training a smaller neural network that simulates the behavior of the original twin, parallel neural network.

FIG. 5 illustrates an example of a method of training a deep neural network with an adaptively trained off-ramp for an early exit according to the present disclosure. A general order of the operations for the method 500 is shown in FIG. 5. Generally, the method 500 begins with start operation 502 and ends with end operation 526. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4A-B, 6, 7, and 8A-B.

Following start operation 502, the method 500 begins with receive operation 504, which receives training data. The training may include an exemplar input query and a correct label as an intended output based on the input query. For example, an exemplar input query may be a photo of an aircraft and a correct label may be an aircraft.

Select operation 506 selects the first intermediate representation layer of the deep neural network to start the prediction process. In aspects, the deep neural network includes a sequence of intermediate representation layers in the order of increasing generality. For example, the first intermediate representation layer (e.g., the intermediate representation layer block 204 (first intermediate representation layer) as shown in FIG. 2) predicts a label based on the input query based on details of the input query (e.g., details of content of the photo). Subsequent layers may predict a label with higher level of generality and may include inference for predicting a label.

Predict operation 508 predicts a label based on the input query at the layer.

Determine operation 510 determines a combination of a weighted entropy value of the predicted label from the layer and a memory of a confidence value from the previous layers. In aspects, the combination may correspond to an off-ramp loss function 306 as shown in FIG. 3.

A decision operation 512 decides whether the combined value is greater than a predetermined threshold. When the combined value is not greater than the predetermined threshold, a decision operation 514 decides whether the layer is the last layer of the deep neural network. When the layer is not the last layer of the deep neural network, select operation 516 selects a next layer to use to predict a label. The select operation 516 returns to the predict operation 508 to predict a label using the subsequent layer.

When the combined value is greater than the predetermined threshold in the decision operation 512, the operation proceeds to a train operation 518. Similarly, when the layer is the last layer of the deep neural model in the decision operation 514, the operation proceeds to the train operation 518. The train operation 518 trains the layer and an off-ramp output generator associated with the layer based on the correct label. The remove operation removes a portion of the training data to create updated training data. Resample operation 522 resamples the training data to create updated data. By resampling the data, a subsequent layer may use less amount of training data because the training data excludes a portion used for training the previous layer. Train operation 524 trains a subsequent layer using the resampled data. In aspects, method 500 may end with end operation 526.

As should be appreciated, operations 502-526 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6A is an example of a method for predicting a label using a deep neural network with an adaptively trained off-ramp for an early exit in accordance with aspects of the present disclosure. In particular, the method 600A uses a static agent to predetermine which layer to off-ramp before using layers of the deep neural network to predict a label. A general order of the operations for the method 600A is shown in FIG. 6A. Generally, the method 600A begins with start operation 602 and ends with end operation 616. The method 600A may include more or fewer steps or may arrange the order of the steps differently than those shown in FIG. 6A. The method 600A can be executed as a set of computer-executable instructions executed by a computer system and encoded or stored on a computer readable medium. Further, the method 600A can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3, 4A-B, 5, 6B, 7, and 8A-B.

Following start operation 602, the method 600A begins with receive operation 604, which receives an input query. In aspects, the input query includes an image for predicting its label.

Determine operation 606 determines one or more features of the input query. In aspects, the one or more features include a level of complexity of the input query. The level of complexity of the input query may determine a depth of intermediate representation layers needed to process the input query in the deep neural network. Determine operation 608 determines a target layer to off-ramp. In aspects, the static agent analyzes features of the received input query and determines a target layer that is likely predicting a label that is the most sufficiently accurate. For example, the determine operation 608 may determine a target layer as the layer to off-ramp based on complexity as indicated by features of the input query (e.g., the image).

Predict operation 610 iteratively predicts a label in response to the received input query using a sequence of intermediate representation layers of the deep neural network up to the target layer as determined in the determine operation 608. Exit operation 612 exits from the deep neural network at the target intermediate representation layer by using an off-ramp for generating an output label of the deep neural network. Transmit operation 614 transmits the predicted label to the client device through the application server 110. In aspects, method 600A may end with end operation 616.

As should be appreciated, operations 602-616 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6B is an example of a method for predicting a label using a deep neural network with an adaptively trained off-ramp for an early exit in accordance with aspects of the present disclosure. In particular, the method 600B uses a dynamic agent to determine whether to use an off-ramp after each intermediate representation layer of the deep neural network to predict a label. A general order of the operations for the method 600B is shown in FIG. 6B. Generally, the method 600B begins with start operation 650 and ends with end operation 664. The method 600B may include more or fewer steps or may arrange the order of the steps differently than those shown in FIG. 6. The method 600B can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3, 4A-B, 5, 6A, 7, and 8A-B.

Following start operation 650, the method 600B begins with receive operation 652, which receives an input query. In aspects, the input query includes, but is not limited to, an image for predicting its label. A predict operation 654 recursively predicts a label of the input query with a confidence score by a layer in a sequence of intermediate representation layers of a deep neural network.

A decision operation 656 decides whether a confidence value of output is greater than a predetermined threshold. When the confidence value is not greater than the predetermined threshold, the operation proceeds to a decision operation 658. The decision operation 658 decides whether the current layer being used for predicting a label is the last layer of the deep neural network. When the layer is not the last layer of the deep neural network, the operation returns to the recursive predict operation 654 and processes similarly in a subsequent intermediate representation layer. When the confidence value of the output is greater than a predetermined threshold, the operation proceeds to a generate operation 660. Similarly, when the current layer is the last layer of the deep neural network, then the operation proceeds to the generate operation 660. The generate operation 660 generates a label based on the latest predicted label. The transmit operation 662 transmits the predicted label to the application server 110. The data retriever 112 may retrieve the predicted label and provide the predicted label on the interactive browser 104 on the client device 102.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an input query receiver 722, a predictor 724, an answer provider 726, a training data receiver 728, and a predictor trainer 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device 102 in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 110 and a label generator 120 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for predicting a label based on a deep neural network with an adaptively trained off-ramp for an early exit according to at least the examples provided in the sections below:

(A1) In one aspect, some embodiments include a computer-implemented method (e.g., 500) of training a deep neural network (e.g., 200) with an adaptive off-ramp for exiting the deep neural network, the method comprising: receiving (e.g., 504) training data (e.g., 142); predicting (e.g., 508), based on the training data, a label using a prediction layer (e.g., 204) in a sequence of prediction layers (e.g., 204-210); determining (e.g., 510) a combination of a weighted entropy value associated with the label and a confidence value of the label; training (e.g., 518), based on the combination and a predetermined threshold, the prediction layer (e.g., 204) and an off-ramp (e.g., 220) associated with the prediction layer to exit from the deep neural network; removing (e.g., 520), based at least on the trained prediction layer, a portion of the training data to create updated training data; resampling (e.g., 522) the updated training data; and training (e.g., 524), based on resampled training data, a subsequent production layer (e.g., 206) of the sequence of prediction layers (e.g., 204-210).

(A2) In some embodiments of the method of A1, the method further includes receiving an input query; determining (e.g., 606) a feature of the input query; determining (e.g., 608), prior to processing the input query in the sequence of prediction layers and based on the feature of the input query, a target prediction layer to exit from the deep neural network, wherein the sequence of prediction layers includes the trained prediction layer; iteratively predicting (e.g., 610), based on the input query, a candidate label using a sequence of the trained prediction layers up to and including the target prediction layer of the deep neural network; exiting (e.g., 612) from the deep neural network using an off-ramp associated with the target prediction layer; and transmitting (e.g., 614) the candidate label.

(A3) In some embodiments of the method of A1 or A2, the method further includes receiving (e.g., 652) an input query; predicting (e.g., 654), based on the input query, the candidate label using the trained prediction layer of the deep neural network; determining (e.g., 654), based on a combination of a candidate weighted entropy value associated with the candidate label, a confidence value associated with the candidate label; exiting (e.g., 660), based on a predetermined threshold and the confidence value associated with the candidate label predicted at the trained prediction layer, the deep neural network using an off-ramp associated with the target prediction layer; and subsequent to the exiting, transmitting (e.g., 662) the candidate label.

(A4) In some embodiments of the method of A1-A3, the resampled training data includes one or more labels, and wherein confidence values associated with the one or more labels are below a predetermined threshold.

(A5) In some embodiments of the method of A1-A4, the weighted entropy value depends on the predetermined threshold and a confidence score of the label predicted by one or more previous prediction layers, and wherein the prediction layer includes an intermediate representation layer of the deep neural network.

(A6) In some embodiments of the method of A1-A5, the weighted entropy value includes a weighted probability distribution indicating likelihood of one or more candidate labels accurately predicting the one or more candidate labels based on an input query, and wherein the weighted probability distribution is based on one or more previous prediction layers accurately predicting the one or more candidate labels.

(A7) In some embodiments of the method of A1-A6, the method further includes: receiving (e.g., 430) a set of labels, wherein each label of the set of labels represents a title of directed content; generating (e.g., 432), based on the set of labels, a set of embedding data, receiving (e.g., 402) an input query, wherein the input query is associated with a selection of content on a web page, iteratively generating (e.g., 404-410), based on the input query and the set of embedding data, an intermediate query representation using one or more prediction layers of the sequence of prediction layers, generating (e.g., 412) a final label representation using a last prediction layer of the sequence of the prediction layers, determining (e.g., 414), based at least on the intermediate query representation and the final label representation, a candidate label, wherein the candidate label specifies a directed content in response to the selection of content on the web page, and transmitting (e.g., 416), responsive to the input query, the candidate label as a candidate title of the directed content.

In another aspect, some embodiments include a system (e.g., system 802) having a processor and memory, the memory storing computer-executable instructions that when executed by the processor cause the system to perform any of the methods described herein (e.g., methods A1-A7).

In another aspect, some embodiments include a computer-readable non-transitory recording medium (e.g., system memory 704) storing computer-executable instructions that when executed by a processor cause a computer system to perform any of the methods described herein (e.g., methods A1-A7).

Any of the one or more above aspects in combination with any other of the one or more aspect. Any of the one or more aspects as described herein.

What is claimed is:

1. A computer-implemented method of training a deep neural network with an adaptive off-ramp for exiting the deep neural network, the method comprising:
   receiving training data;
   predicting, based on the training data, a label using a prediction layer in a sequence of prediction layers;
   determining a combination of a weighted entropy value associated with the label and a confidence value of the label;
   training, based on the combination and a predetermined threshold, the prediction layer and an off-ramp associated with the prediction layer to exit from the deep neural network;
   removing, based at least on the trained prediction layer, a portion of the training data to create updated training data;
   resampling the updated training data; and
   training, based on resampled training data, a subsequent production layer of the sequence of prediction layers.

2. The computer-implemented method of claim 1, the method further comprising:

receiving an input query;
determining a feature of the input query;
determining, prior to processing the input query in the sequence of prediction layers and based on the feature of the input query, a target prediction layer to exit from the deep neural network, wherein the sequence of prediction layers includes the trained prediction layer;
iteratively predicting, based on the input query, a candidate label using a sequence of the trained prediction layers up to and including the target prediction layer of the deep neural network;
exiting from the deep neural network using an off-ramp associated with the target prediction layer; and
transmitting the candidate label.

3. The computer-implemented method of claim 2, the method further comprising:
receiving an input query;
predicting, based on the input query, the candidate label using the trained prediction layer of the deep neural network;
determining, based on a combination of a candidate weighted entropy value associated with the candidate label, a confidence value associated with the candidate label;
exiting, based on a predetermined threshold and the confidence value associated with the candidate label predicted at the trained prediction layer, the deep neural network using an off-ramp associated with the target prediction layer; and
subsequent to the exiting, transmitting the candidate label.

4. The computer-implemented method of claim 1, wherein the resampled training data includes one or more labels, and wherein confidence values associated with the one or more labels are below a predetermined threshold.

5. The computer-implemented method of claim 1, wherein the weighted entropy value depends on the predetermined threshold and a confidence score of the label predicted by one or more previous prediction layers, and wherein the prediction layer includes an intermediate representation layer of the deep neural network.

6. The computer-implemented method of claim 1, wherein the weighted entropy value includes a weighted probability distribution indicating likelihood of one or more candidate labels accurately predicting the one or more candidate labels based on an input query, and wherein the weighted probability distribution is based on one or more previous prediction layers accurately predicting the one or more candidate labels.

7. The computer-implemented method of claim 1, the method further comprising:
receiving a set of labels, wherein each label of the set of labels represents a title of directed content;
generating, based on the set of labels, a set of embedding data;
receiving an input query, wherein the input query is associated with a selection of content on a web page;
iteratively generating, based on the input query and the set of embedding data, an intermediate query representation using one or more prediction layers of the sequence of prediction layers;
generating a final label representation using a last prediction layer of the sequence of the prediction layers;
determining, based at least on the intermediate query representation and the final label representation, a candidate label, wherein the candidate label specifies a directed content in response to the selection of content on the web page; and
transmitting, responsive to the input query, the candidate label as a candidate title of the directed content.

8. A system for predicting a label using an adaptive off-ramp for an early exit from a deep neural network, the system comprises:
a processor; and
a memory storing computer-executable instructions that when executed by the processor cause the system to:
receive an input query;
determine a feature of the input query;
determine, prior to processing the input query in the sequence of prediction layers and based on the feature of the input query, a target prediction layer to exit from the deep neural network, wherein the sequence of prediction layers includes a trained prediction layer;
iteratively predict, based on the input query, a candidate label using the sequence of trained prediction layers up to and including the target prediction layer of the deep neural network;
exit from the deep neural network using an off-ramp associated with the target prediction layer; and
transmit the candidate label.

9. The system of claim 8, further comprising computer-executable instructions that when executed by the processor cause the system to:
predict, based on the input query, the candidate label using the trained prediction layer of the deep neural network;
determine, based on a combination of a candidate weighted entropy value associated with the candidate label, a confidence value associated with the candidate label;
exit, based on a predetermined threshold and the confidence value associated with the candidate label predicted at the trained prediction layer, the deep neural network using an off-ramp associated with the trained prediction layer; and
subsequent to the exiting, transmit the candidate label.

10. The system of claim 9, further comprising computer-executable instructions that when executed by the processor cause the system to:
receive training data;
predict, based on the training data, the label using a prediction layer in a sequence of prediction layers;
determine a combination of a weighted entropy value associated with the label and a confidence value of the label;
training, based on the combination and a predetermined threshold, the prediction layer and an off-ramp associated with the prediction layer for exiting the deep neural network;
removing, based at least on the trained prediction layer, a portion of the training data to create updated training data;
resampling the updated training data; and
training, based on resampled training data, a subsequent prediction layer of the sequence of prediction layers.

11. The system of claim 9, wherein the training the prediction layer and the off-ramp associated with the prediction layer uses a subset of the training data, and wherein the subset of the training data corresponds to data where the previous prediction layer predicts with the confidence value below a predetermined threshold.

12. The system of claim 10, wherein the weighted entropy value is associated with a previous prediction layer, and wherein the weighted entropy value depends on whether the previous prediction layer predicts the label with a confidence value that is higher than a predetermined threshold, and wherein the prediction layer includes an intermediate representation layer of the deep neural network.

13. The system of claim 9, wherein the candidate weighted entropy value includes a weighted probability distribution indicating likelihood of one or more candidate labels accurately predicting the one or more candidate labels based on the input query, and wherein the weighted probability distribution is based on one or more previous prediction layers accurately predicting the one or more candidate labels.

14. The system of claim 9, further comprising computer-executable instructions that when executed by the processor cause the system to:
receive a set of labels, wherein each label of the set of labels represents a title of directed content;
generate, based on the set of labels, a set of embedding data;
receive an input query, wherein the input query is associated with a selection of content on a web page;
iteratively generate, based on the input query and the set of embedding data, an intermediate query representation using one or more prediction layers of the sequence of prediction layers;
generate a final label representation using a last prediction layer of the sequence of the prediction layers;
determine, based at least on the intermediate query representation and the final label representation, a candidate label, wherein the candidate label specifies a directed content in response to the selection of content on the web page; and
transmit, responsive to the input query, the candidate label as a candidate title of the directed content.

15. A computer storage media storing computer-executable instructions that when executed by a processor cause a computer system to perform operations comprising:
receiving an input query;
determining a feature of the input query;
determining, prior to processing the input query in a sequence of prediction layers and based on the feature of the input query, a target prediction layer to exit from a deep neural network, wherein the sequence of prediction layers includes a trained prediction layer, and wherein the trained prediction layer includes an intermediate representation layer of the deep neural network;
iteratively predicting, based on the input query, a candidate label using the sequence of trained prediction layers up to and including the target prediction layer of the deep neural network;
exiting the deep neural network using an off-ramp associated with the target prediction layer; and
transmitting the candidate label.

16. The computer storage media of claim 15, further comprising computer-executable instructions that when executed cause operations comprising:
predicting, based on the input query, the candidate label using the trained prediction layer of the deep neural network;
determining, based on a combination of a candidate weighted entropy value associated with the candidate label, a confidence value associated with the candidate label;
exiting, based on a predetermined threshold and the confidence value associated with the candidate label predicted at the trained prediction layer, the deep neural network using an off-ramp associated with the trained prediction layer; and
subsequent to the exiting, transmitting the candidate label.

17. The computer storage media of claim 15, further comprising computer-executable instructions that when executed cause operations comprising:
receiving training data;
predicting, based on the training data, the label using a prediction layer in a sequence of prediction layers;
determining a combination of a weighted entropy value associated with the label and a confidence value of the label;
training, based on the combination and a predetermined threshold, the prediction layer and an off-ramp associated with the prediction layer for exiting from the deep neural network;
removing, based at least on the trained prediction layer, a portion of the training data to create updated training data;
resampling the updated training data; and
training, based on resampled training data, a subsequent prediction layer of the sequence of prediction layers.

18. The computer storage media of claim 15, further comprising computer-executable instructions that when executed cause operations comprising:
exiting, based on a level of workload of the computing system, the deep neural network using an off-ramp associated with the target prediction layer.

19. The computer storage media of claim 16, wherein the training the prediction layer and the off-ramp associated with the prediction layer uses a subset of the training data, and wherein the subset of the training data corresponds to data where a previous prediction layer predicts with the confidence value below a predetermined threshold, and wherein the prediction layer includes an intermediate representation layer of the deep neural network.

20. The computer storage media of claim 15, further comprising computer-executable instructions that when executed cause operations comprising:
receiving a set of labels, wherein each label represents a title of directed content;
generating, based on the set of labels, a set of embedding data;
receiving an input query, wherein the input query is associated with a selection of content on a web page;
iteratively generating, based on the input query and the set of embedding data, an intermediate query representation using one or more prediction layers of the sequence of prediction layers;
generating a final label representation using a last prediction layer of the sequence of the prediction layers;
determining, based at least on the intermediate query representation and the final label representation, a candidate label, wherein the label specifies a directed content in response to the selection of content on the web page; and
transmitting, responsive to the input query, the candidate label as a candidate title of the directed content.

* * * * *